United States Patent [19]
Sobol et al.

[11] Patent Number: 5,907,665
[45] Date of Patent: *May 25, 1999

[54] METHOD AND APPARATUS FOR TRANSFORMING IMAGE DATA

[75] Inventors: Robert E. Sobol, Fort Collins; Barbara A. Winternitz, Bellvue, both of Colo.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/540,632

[22] Filed: Oct. 11, 1995

[51] Int. Cl.$^6$ .............................. G06T 5/00; H04N 1/407
[52] U.S. Cl. ................ 395/109; 382/237; 382/270; 382/269; 358/447; 358/455; 358/466
[58] Field of Search .................... 382/269, 266, 382/237, 251, 270, 273, 169, 296–299; 358/455, 465, 466, 447, 448, 451; 395/109

[56] References Cited

U.S. PATENT DOCUMENTS

| | | | |
|---|---|---|---|
| 3,723,649 | 3/1973 | Pitegoff et al. | 358/465 |
| 4,593,325 | 6/1986 | Kannapell et al. | 358/455 |
| 4,723,173 | 2/1988 | Tanioka | 358/465 |
| 4,977,605 | 12/1990 | Fardeau et al. | |
| 5,339,368 | 8/1994 | Higgins-Luthman et al. | 382/169 |

OTHER PUBLICATIONS

Ernst, H., *Einführung in die digitale Bildverarbeitung*, 1991 Franzis–Verlag GmbH, München, pp. 130–133.
Klette, R., et al. *Handbuch der Operatoren für die Bildbearbeitung*, Friedr. Vieweg & Sohn Verlagsgesellschaft mbH, Braunschweig/Wiesbaden, 1995, pp. 8–9.
Caere Corporation, Image Assistant, Version 1.10, 1990–1993.

*Primary Examiner*—Scott Rogers

[57] ABSTRACT

A method for transforming grayscale image data in accordance with preselected transformation factors may be accomplished by first reducing the number of gray image pixels by "punching to black" gray image pixels having intensity values less than a black punch value and by "punching to white" gray image pixels having intensity values greater than a white punch value. The resulting "punched" image data are then transformed in accordance with preselected transformation factors to create transformed image data. The transformed image data are then converted to binary image data, which may be reproduced in a conventional manner.

19 Claims, 5 Drawing Sheets

METHOD AND APPARATUS FOR TRANSFORMING IMAGE DATA

FIELD OF THE INVENTION

This invention relates to optical scanning in general and more specifically to the transformation of grayscale image data to reproduce high-quality images that conform to selected size and orientation parameters.

BACKGROUND

Optical scanners are devices that produce machine or computer readable data representative of a scanned object, such as, for example, a page of printed text, a drawing, or a photograph. A commonly used type of optical scanner utilizes a line-focus system to focus light reflected by the object onto the surface of a detector comprising a plurality of tiny, light sensitive elements arranged along a line. Each light sensitive element of the detector corresponds to a small area location on the object being scanned and is commonly referred to as a "picture element" or "pixel." Since the light sensitive elements of the detector are arranged along a line, the electronic signals produced thereby together correspond to a line of pixels that is commonly referred to as a "scan line." Accordingly, the entire object may be scanned by moving the optical system with respect to the object so that the elements of the detector are successively exposed to adjacent scan lines on the object. As the image is scanned, data signals from the light sensitive elements of the detector are received and processed by an appropriate data processing system. The data processing system may in turn subsequently store the data on a suitable medium or generate a display signal therefrom, thus allowing an image of the object to be reproduced on a display device such as a CRT or a printer.

The image data produced by an optical scanner of the type described above can usually be regarded as continuous. That is, each pixel has an intensity value that corresponds to a particular shade of gray in a range of shades of gray that extends from black to white. Since most commonly available black and white scanners are capable of detecting 256 or even as many as 1024 separate shades of gray, the image data thus may be regarded as substantially continuous and will be referred to herein as "continuous grayscale image data," or simply "grayscale image data."

While such grayscale image data can be used to reproduce a fairly accurate image of the scanned object, they take up a substantial amount of computer memory. Consequently, it is common for the scanning utility or capture program associated with the scanner to convert the continuous grayscale image data from the scanner into a more compact form. For example, if the image being scanned comprises printed text or a simple line drawing, it is usually convenient to scan the image as a binary data type. Scanning the image as a binary data type "forces" the scanner to recognize only two shades of gray, typically black and white. Consequently, such binary image data are only capable of reproducing black and white images with no intermediate shades of gray. However, the advantage of scanning an object as a binary data type is that the resulting binary image data require much less memory for storage.

While optical scanners of the type described above may be used for a wide variety of purposes, such as to scan pictures or photos, or to scan written documents for subsequent optical character recognition (OCR), they tend to be most commonly used to scan line art drawings, i.e., drawings consisting essentially of black or dark lines on white or light colored backgrounds. When such line art drawings are scanned, it is usually with the desire to import or integrate the line-art drawings into other kinds of documents, such as reports or presentations, which themselves may be created with the aid of separate application programs, such as word processors or desktop publishing programs. While application programs exist that will allow user to import a binary image data file of scanned line art image into such a document, the scanned image reproduced thereby is often of inferior quality. For example, it is not uncommon for the scanned line art image to include stair-steps or "jaggies." Briefly, stair-steps or "jaggies" are digital image artifacts that make curved and angled lines of the image appear to be a succession of short line segments that are slightly offset from one another.

While such stair-step patterns or "jaggies" may be the result of inadequate scanning or printing resolution, they are more often the result of the various image transformation steps that are performed by the user. For example, a user will often find it necessary or desirable to change the size (i.e., scaling) or the angular orientation (i.e., rotation) of the scanned line art image to allow it to fit within space allotted in the document. However, since such transformation processes (e.g., scaling or rotation) are carried out on binary image data, the result is the creation of visible jaggies. The reason that visible jaggies are created when transforming such binary image data is that the binary image data do not contain all of the information required to accurately reproduce the precise location of the edges of the lines of the original image. While the location errors are small, they tend to accumulate with subsequent data transformation steps. Consequently, the more the image represented by the binary image data is enlarged or rotated, the worse the location errors tend to become, with the end result being the creation of visible jaggies.

As an example of this phenomenon, consider a line art image scanned at a resolution sufficiently high so that jaggies cannot be seen, typically about 600 dots per inch (dpi). If the size of the image is enlarged by a factor of three (3) by the application program, the effective resolution of the image will be reduced by a corresponding amount. That is, the effective resolution of the image will drop to about 200 dpi, a resolution low enough to result in an image having noticeable jaggies.

While it is possible to minimize the likelihood of creating jaggies in the final image by taking certain steps during the scanning process, such steps are usually inconvenient or can only be effectively carried out by highly knowledgeable and experienced users. For example, if the user knows the exact size of the image that is to be reproduced by the application program, he or she can adjust various scanning parameters, such as scanning resolution, scanning size, and the position angle of the line art image being scanned, to ensure that the resulting image data will allow for the reproduction of a substantially jaggy-free image. Unfortunately, however, it is rare for the person scanning the original line art image to know in advance the precise size of the image that is to be reproduced in the application program. Further, even if the person knows the desired size of the final image, he or she must still know how to adjust the various scanning parameters (i.e., resolution, size, position angle, etc.) to ensure a substantially jaggy-free image. In practice, it is far more common for the user to make a guess as to the size of the image in the final document, set the scanning parameters to the values that the user believes will produce a jaggy-free image, and hope for the best. In many cases, the guess is incorrect and the user must go back and re-scan the original image with different scanning parameters in the hopes that the new image data will result in a higher quality image.

Consequently, a need exists for a method and apparatus that will allow for the re-scaling and/or rotation of the scanned image data, but without the danger of creating visible jaggies in the final image. Ideally, such a method and apparatus should also dispense with the need for the user to know in advance the size of the image that is to be reproduced in the final document as well as the need to manually set the scanning parameters. Additional advantages could be realized if such a method and apparatus would allow the user to re-scale and/or rotate the image while operating within the application program. Still other advantages could be realized if such re-scaling and/or rotation operations could be carried out while minimizing the amount of storage space required for the image data.

SUMMARY OF THE INVENTION

A method for transforming grayscale image data in accordance with preselected transformation factors may be accomplished by first reducing the number of gray image pixels by "punching to black" gray image pixels having intensity values less than a black punch value and by "punching to white" gray image pixels having intensity values greater than a white punch value. The resulting "punched" image data are then transformed in accordance with preselected transformation factors to create transformed image data. The transformed image data are then converted to binary image data, which may be reproduced in a conventional manner.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
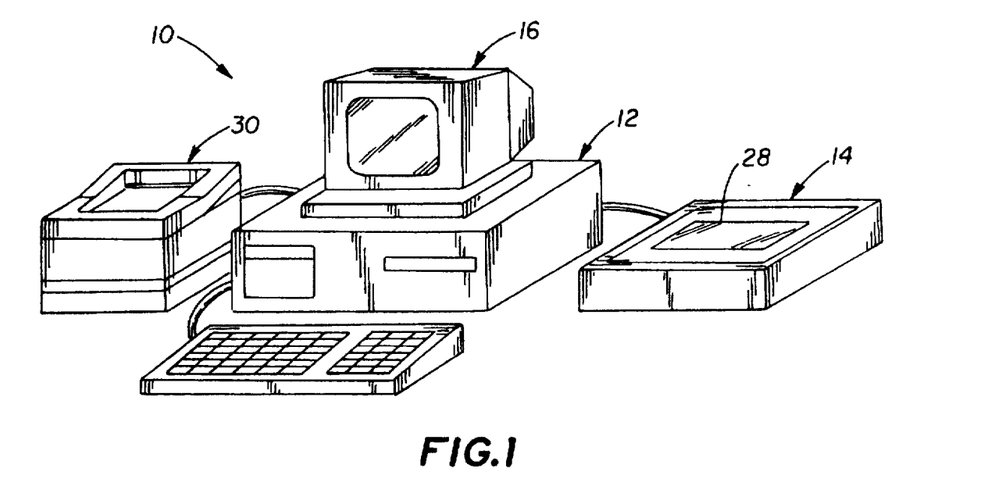
FIG. 1 is a perspective view of a computer system for executing a computer program for transforming image data to reproduce an image conforming to selected size and orientation parameters.
Figure 2:
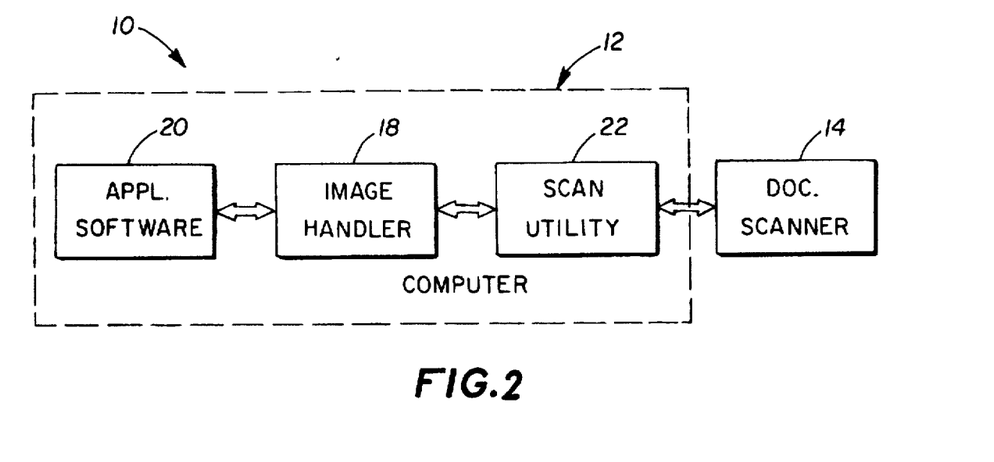
FIG. 2 is a block diagram of the software architecture of the computer system shown in FIG. 1.

Apparatus 10 employed in a method for transforming image data is best seen in FIGS. 1 and 2. The method could be implemented by a general purpose programmable computer, such as a personal computer 12, to allow image data produced by an optical scanner 14 to be integrated into a document (not shown) being produced by application software 20 (FIG. 2), such as a word processor or desktop publishing program. The document and integrated image may then be displayed on a suitable display device, such as CRT 16, or printed on a printer 30. In one preferred embodiment, the steps of the method 10 are implemented by an image handler 18 (FIG. 2), which itself is implemented through a separate object linking and embedding program or system, such as OLE or OpenDoc (not shown), as will be described in greater detail below.

The image handler 18 can be accessed by the user from within the application software 20 any time the user desires to import an image into the document or to revise a previously imported image. For example, if the user desires to place an image, such as the line art image 24 shown in FIG. 4, into the document being created by the application software 20, the user can initiate or "launch" the image handler 18 from within the application program 20 by making a menu selection (not shown) or by activating or "clicking" a suitable icon (also not shown) appearing on the CRT 16. Once launched, the image handler 18 performs a low resolution scan or "pre-scan" of the object containing the line art drawing 24 and the pre-scan image is displayed on the CRT 16. At this point, the user may select the portion of the image that is to be imported into the document. Once the user is satisfied with his or her selection, the image handler 18 performs a high resolution "re-scan" of the object and displays the re-scanned image on the CRT 16. At this point the user may transform the selected image portion as necessary so that it will fit within the space allotted to it in the document.

The image handler 18 allows for the reproduction of a substantially jaggy-free image by performing all of the image transformation processes or steps (e.g., scaling and rotation) on grayscale image data. While such processing of grayscale image data would normally require an extremely large amount of memory and a substantial amount of processing time, the method according to the present invention first compresses the grayscale image data to substantially reduce the amount of memory required to store the image data. Thus, when the grayscale image data need to be accessed for editing, e.g., sizing and/or scaling, the image handler 18 retrieves and re-constructs the compressed grayscale image data so that the editing operations may be carried out on grayscale image data.

The data compression process is performed immediately following the acquisition of the grayscale image data from the maximum or high resolution re-scan of the particular portion of the image that was previously selected by the user. The first step in the image data compression process is to select a predetermined pixel intensity value, referred to herein as a "white punch value" 46 (FIG. 5), above which all pixels are "mapped" to white. That is, all pixels that are lighter than a certain shade of gray (i.e., the shade of gray that corresponds to the white punch value 46) are re-assigned (or mapped to) an intensity value that corresponds to the intensity value for white. Similarly, all pixels darker than another certain shade of gray (i.e., the shade of gray that corresponds to a "black punch value" 44) are re-assigned an intensity value that corresponds to the intensity value for black. The resulting "punched" image data contain a substantial number of long strings of adjacent pixels that have identical values (i.e., either black or white), which are then compressed by a conventional data compression technique, such as run-length encoding.

A significant advantage of the present invention is that it allows a user to import image data into a document that is being created by a separate application program 20 without fear that the resulting image will contain annoying jaggies or other image artifacts. The user is also relieved of the need to determine beforehand the size of the image, thus the need to determine the appropriate scanning parameters to assure a substantially jaggy-free image. The method also minimizes the amount of memory required to store the image data by compressing the image data before performing any image transformation processes (e.g., scaling and/or rotation). That is, the data compression process allows the image data file to be reduced in size so that it requires about the same amount of memory as a conventional binary data file, while still preserving the grayscale image data for those pixels immediately adjacent the various lines on the line art image.

Before proceeding with a detailed description of the method for transforming image data, it is useful to consider the features and attributes of a line art drawing and the resulting image data produced by the scanner.

Figure 4:
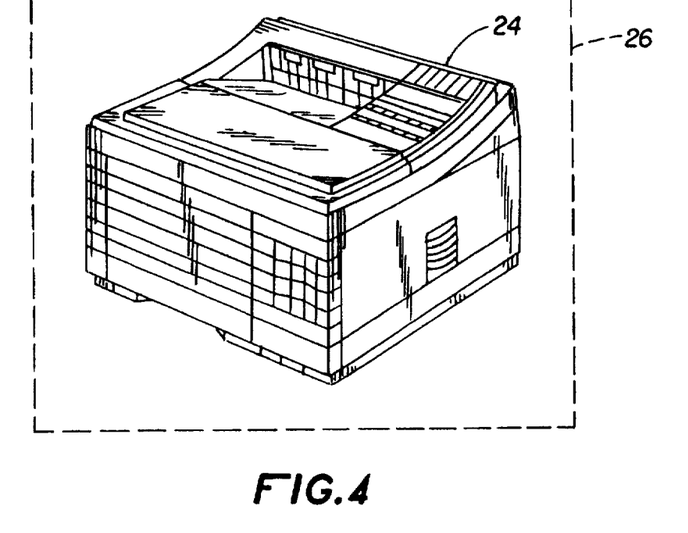
FIG. 4 is a perspective view of a line art image that may be reproduced by the method and apparatus for transforming image data.
Figure 5:
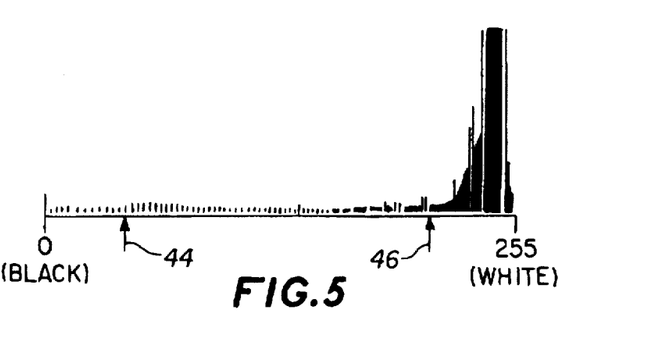
FIG. 5 is a histogram showing the distribution of grayscale intensity values for the pixels created by scanning a typical line art image.

Referring now to FIG. 4, a line art drawing 24 may comprise a plurality of black (or dark) lines drawn on a white (or light colored) background. Alternatively, of course, the line art drawing could also comprise a plurality of white or light lines drawn against a black or dark colored background. In any event, when the drawing 24 contained within the boarder or selected area 26 is scanned by the optical scanner 14 (FIG. 1), the resulting image data will comprise a plurality of pixels (not shown), each of which will have a numerical intensity value between a black value and a white value. By way of example, the optical scanner 14 shown in FIG. 1 will produce image data having intensity values between 0, corresponding to black, and 255, corresponding to white. That is, the intensity values comprising the image data may represent up to 256 separate shades of gray. Since the drawing 24 contained within the selected area 26 consists of mostly white space, most of the pixels in the grayscale image data will have intensity values at or near 255 (the intensity value for white), as best seen in FIG. 5. Similarly, a large number of pixels will have intensity values at or near 0 (the intensity value for black), which, of course, correspond to the black lines of the line art drawing 24. As can be seen in FIG. 5, the white and black pixels do not all comprise intensity values of exactly 255 (for white) and 0 (for black), but rather encompass a range of intensity values around the "pure" white intensity value (255) and the "pure" black intensity value (0). This range is the result of the "noise" inherent in the grayscale scanning of images due to variations in the color and shading of the background, electrical noise generated by the various internal components of the scanner, the presence of dirt or other imperfections on the platen glass 28 (FIG. 1), and other imperfections and non-linearities in the scanner. Consequently, most line art images scanned by optical scanners, such as optical scanner 14, do not result in simple black and white intensity values, but contain a fairly large population of nearly black and nearly white pixels as well. As is also seen in FIG. 5, the image data will also include a lesser number of "gray" pixels that have intensity values distributed fairly uniformly between black and white. These "gray" pixels represent the gray areas immediately next to the black lines of the drawing 24, thus are essential to the accurate reproduction and placement of those lines.

Referring back now to the present invention and to FIGS. 1 and 2, a general purpose programmable computer, such as personal computer 12, may be programmed to perform the steps comprising the method for transforming grayscale image data produced by the optical scanner 14. In one preferred embodiment, the program containing the instructions for performing the method may be loaded into the computer 12 by way of any convenient medium well-known in the art, such as a magnetic or optical disk (not shown). Alternatively, the computer 12 may be programmed by any other of a wide variety of methods and/or devices well known in the art for programming general purpose computers to perform specific functions. In still another embodiment, the method may be performed by a device (not shown) specifically designed (i.e., "hard wired") to carry out the steps of the method.

In the embodiment shown and described herein, the method is implemented by way of an image handler 18 which itself is implemented by a separate object linking and embedding program or system, such as OLÉ, available from the Microsoft Corporation of Redmond, Wash., or OpenDoc, available from CI Labs of Sunnyvale, Calif. Alternatively, however, the method may be implemented as a stand-alone software package, or by way of any other means known in the art for implementing objects or parts having distinct attributes or behaviors. The application software 20 may comprise any software package, such as a word processor or desk-top publishing program, for creating documents, reports, etc., for which it may be desirable to "import" image data produced by optical scanner 14. Similarly, the scan utility 22 may comprise any of a wide variety of programs for controlling the operation of optical scanners, such as "DeskScan II" or "HP ScanJet Copy for the Macintosh," both of which are available from the Hewlett-Packard Company.

Figure 3:
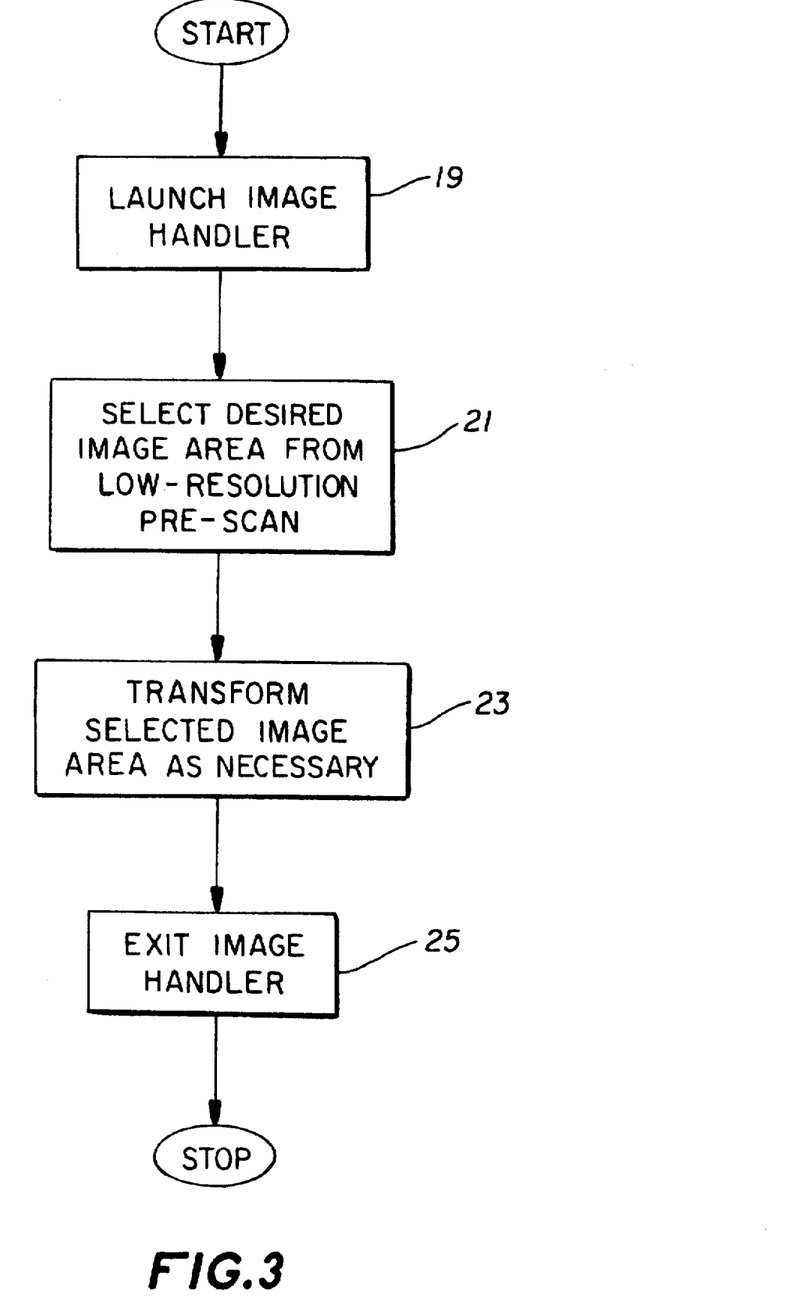
FIG. 3 is a flow diagram of process steps that may be performed by a user in implementing the image handler shown in FIG. 2.

As mentioned above, a user can import a line art image, such as line art image 24 (FIG. 4) into the document (not shown) being created by the application software 20 by "launching" the image handler 18 from within the application program 20. In one preferred embodiment wherein the image handler 18 is implemented through OLÉ, the "launch" is accomplished by using the "Insert Object" command from the "insert" menu. Alternatively, the launch may be accomplished by activating or clicking a suitable icon (not shown) appearing on CRT 16. In any event, the steps that may be performed by a user to accomplish the subsequent selection, transformation, and importation of the scanned line art image into the application document are shown in FIG. 3.

In the first step 19, the user initiates or "launches" the image handler 18. If the image to be imported into the document has not yet been scanned, the image handler 18 will instruct the scan utility 22 to perform an initial or low-resolution "pre-scan" of the object containing the corresponding line art 24 (FIG. 4). The "pre-scan" image is then displayed on the CRT 16, usually via the scan utility 22, although the pre-scan image could also be displayed via image handler 18 as well. At this point, the user can view the scanned object in its entirety and select those parts of the scanned object that are to be imported into the main document. See step 21. After the user has selected the desired image portion, the image handler 18 again activates the scan utility 22 to re-scan the particular portion of the image that was selected by the user. This time, however, the re-scan is performed at the maximum resolution of the scanner 14.

The image data from the high resolution re-scan of the selected image portion are received by the image handler 18 which then compresses the image data and stores the data as a compressed grayscale image data file, as will be described in greater detail below. The compressed grayscale image data file may then be accessed as necessary by the image handler 18 to perform all subsequent operations, such as image transformations i.e., editing, and display of the high resolution image on the CRT 16.

Referring back now to FIG. 3, and after the high resolution grayscale image data are compressed by the image handler 18, the user is given the option at step 23 of rescaling and/or rotating the image as necessary to allow the selected image portion to fit within the allotted space in the document. Once the user is satisfied as to the size and orientation of the selected image portion, the image handler 18 may store the commands necessary to transform the image data. Then, when the user desires to print a document containing the transformed line art image, the image handler 18 retrieves and re-constructs the compressed grayscale image data file, retrieves the transformation commands, transforms the re-constructed grayscale image data, and finally converts the re-constructed and transformed grayscale image data file into binary image data, which data may then be sent to a printer. The user may then exit the image handler 18 at step 25 and return to the application software 20 (FIG. 2).

Figure 7:
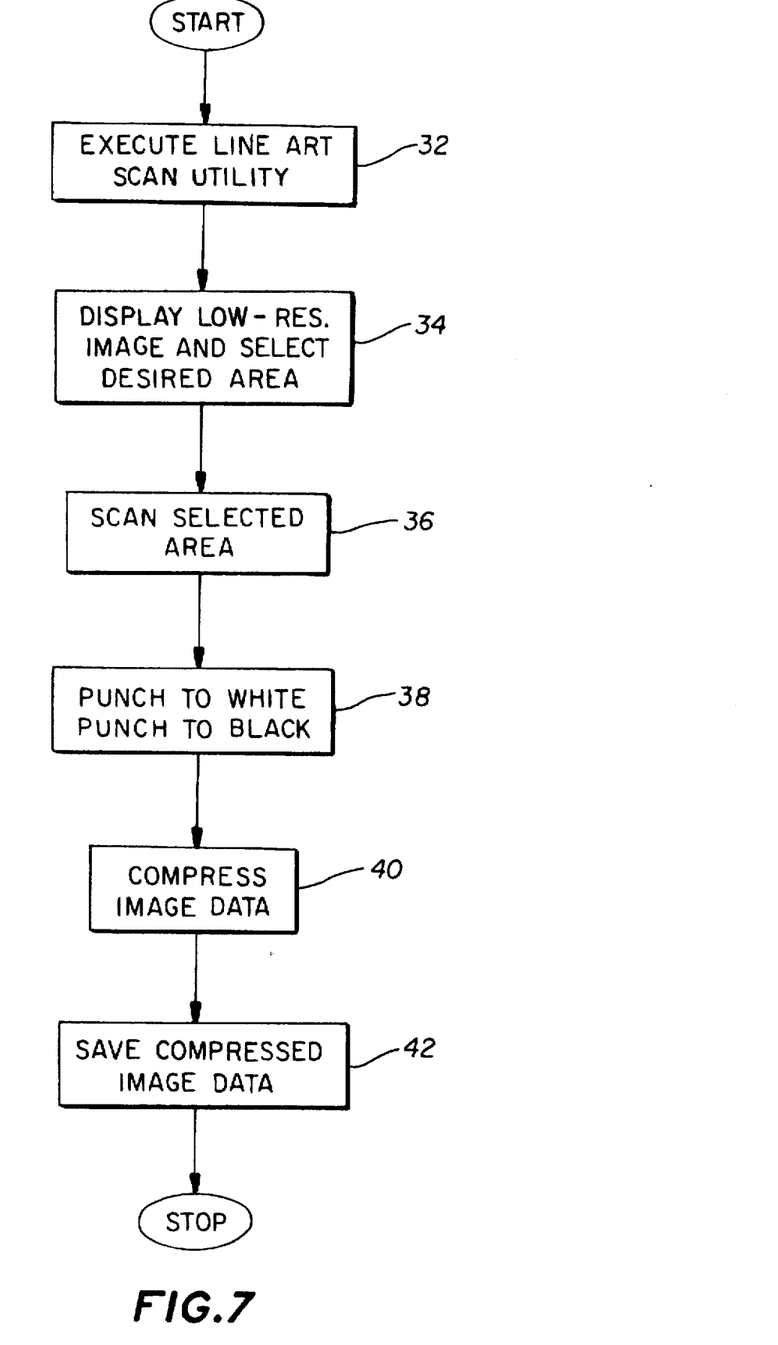
FIG. 7 is a flow diagram of the process steps performed by the image handler shown in FIG. 2.

The steps performed by the image handler 18 during the foregoing process are shown in FIG. 7. In the first step 32 the image handler 18 instructs the line art scan utility 22 (FIG. 2) to perform the low resolution scan or "pre-scan" of the object containing the line art 24. The resulting grayscale image data from the scanner 14 are then converted by the scan utility 22 as required so that they can be displayed on CRT 16. See step 34. Alternatively, the image handler 18 or a display tool (not shown) could be used to display anti-aliased lines onto the CRT 16 to produce a substantially jaggy-free image. Regardless of the particular display format that is used, the user will see a low-resolution image of the entire scanned object on the CRT 16.

As was described above, the user may now select either the entire image or a portion thereof to be imported into the document. While any of a wide variety of methods may be used to allow the user to select image portions, one preferred embodiment of the invention allows the user to "click" an icon (not shown) displayed on CRT 16 and "draw" a box around the desired portion of the image. This technique is well known and is used in many drawing programs, such as Claris Works and AutoCAD.

Once the desired portion of the line art 24 has been selected by the user, the image handler 18 proceeds to step 36 (FIG. 7), and commands the scan utility 22 to perform a high resolution scan or "re-scan" of only the selected image portion. It is preferred, but not required, that the "re-scan" of the selected image portion be performed at the maximum resolution of the scanner (about 300 dots per inch (dpi) for currently available scanners), although other resolutions could also be used. The grayscale image data produced by this high resolution re-scan are not changed or manipulated by the scanning utility 22, but are fed directly to the image handler 18. As was described above, the grayscale image data will contain a large number of pixels having intensity values between 0 (i.e., black) and 255 (i.e., white), and will require a substantial amount of computer memory for storage.

Figure 6:
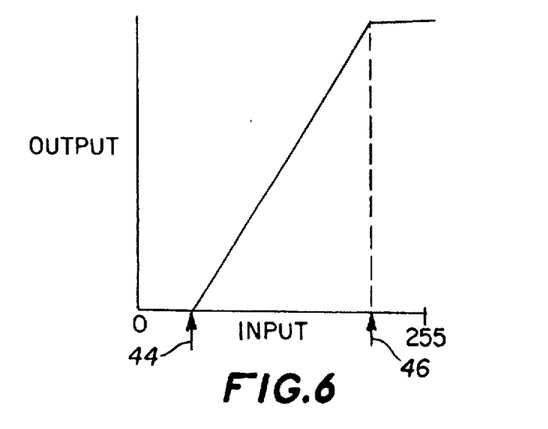
FIG. 6 is a tone map showing the range of pixel values existing in the grayscale image data after the light pixels have been punched to white and the dark pixels have been punched to black.

As soon as the grayscale image data are received by the image handler 18, it begins the data compression process by performing step 38. Step 38 "punches to black" the darker pixels having intensity values less than the black punch value 44 and "punches to white" lighter pixels having intensity values greater than the white punch value 46. See FIG. 5. That is, all pixels having intensity values less than the black punch value 44 are assigned the intensity value corresponding to black (i.e., 0), whereas all pixels having intensity values greater than the white punch value 46 are assigned the intensity value corresponding to white (i.e., 255). The punch to black and punch to white process step 38 can be thought of as having a transfer function or "tone map" 48 substantially as shown in FIG. 6. That is, "input" intensity values (i.e., the intensity values corresponding to the original grayscale image data) less than the black punch value 44 are mapped or "punched" to black (i.e., 0), and "input" intensity values greater than the white punch value 46 are mapped to white (i.e., 255). While the exact black and white punch values 44, 46 are not particularly critical, and may vary from application to application and depending on the particular colors and shading of the drawing being scanned, they should be selected so that they will significantly reduce the number of pixels having intermediate or gray values, but without eliminating the grayscale image data corresponding to those pixels located near the edges of the lines of the line art drawing 24. As mentioned above, the pixels located near the edges of the lines of the line art drawing 24 are critical in allowing the reproduction of a substantially jaggy-free image. In one preferred embodiment having pixel intensity values between 0 and 255, the black punch value 44 was selected to be 32, and the white punch value 46 was selected to be 196.

After process 38 is complete, the grayscale image data will contain many groups or strings of adjacent pixels that have identical intensity values, i.e., either black or white. Such large numbers of long strings of identical data readily lend themselves to being compressed by any one of a number of conventional data compression algorithms, such as run length encoding algorithms. Consequently, the image handler 18 next performs step 40, which compresses the grayscale image data using a run length encoding algorithm. In one preferred embodiment, the data are compressed using a run-length encoding algorithm, such as "pack bits," although other types of data compression algorithms could also be used. The compressed grayscale image data may either be saved as a separate file for later use, as in step 42, or the compressed data file may be accessed immediately to allow the image represented thereby to be scaled and/or rotated as necessary to fit within the document being created by the application software 20.

While it is preferred that the data compression process described above comprise the punch to white and punch to black steps, as described above, such process steps are not required if the data compression algorithm is of the type that is capable of compressing data that do not comprise long strings of identical values. If such a data compression algorithm is used, then the punch to white and punch to black steps could be eliminated.

As was described above, the image handler 18 displays the high resolution or re-scan of the line art image 24 on the CRT 16 to allow the user to transform (i.e., scale and or rotate) the image 24 as required so that it will fit within the allotted space. In one preferred embodiment, the re-scan image data may be displayed via the image handler 18 in a conventional manner, although image handler 18 could also be configured to display anti-aliased lines onto the CRT 16 using any of a number of algorithms well-known in the art for displaying anti-aliased lines on a CRT.

Figure 8:
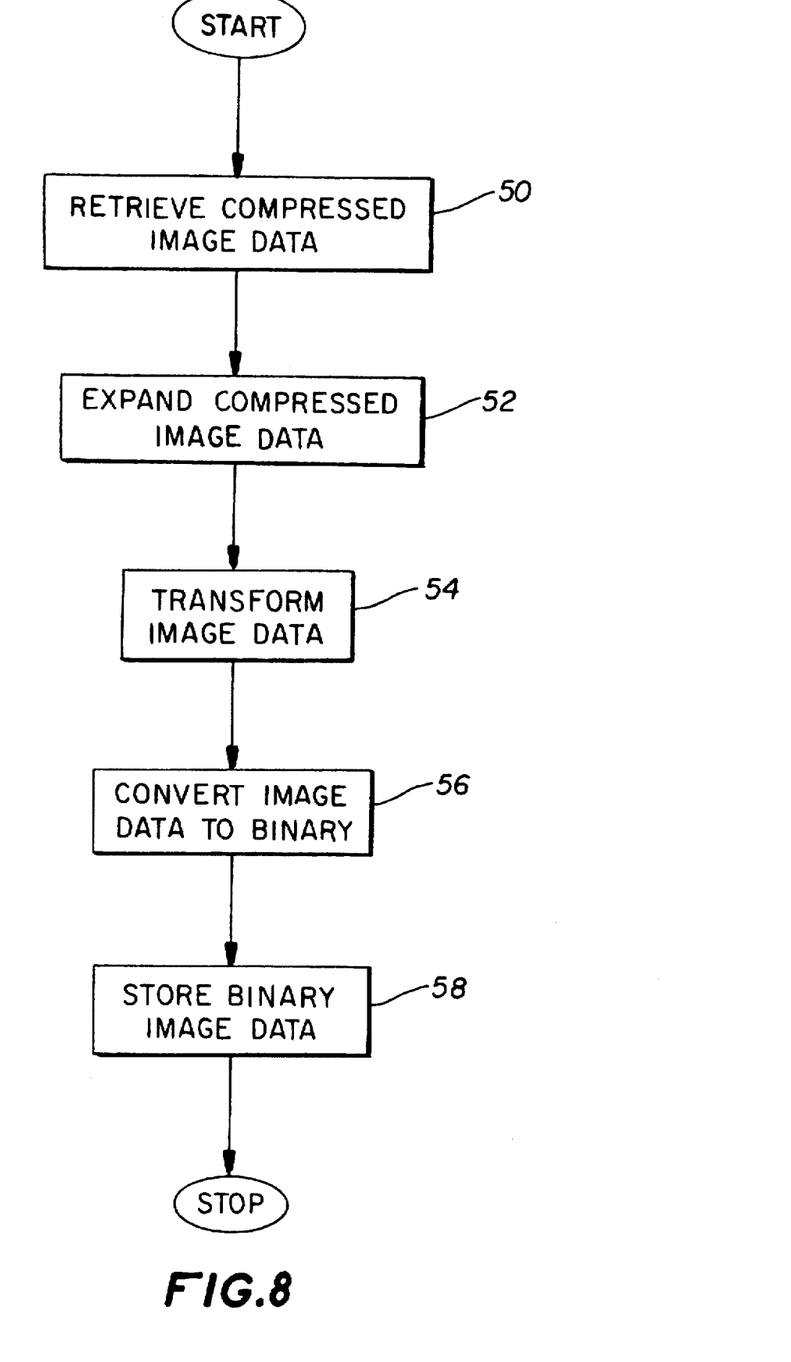
FIG. 8 is a flow diagram of additional process steps that may be performed by the image handler shown in FIG. 2.

Referring now to FIG. 8, if the compressed image data from step 40 were saved in step 42, the first step performed by the image handler 18 will be to retrieve the compressed image data at step 50. Once the data are retrieved, they are expanded or reconstructed by step 52 so that they can be transformed as may be desired by the user. Since the particular steps required to expand or reconstruct the compressed image data will depend on the particular data compression scheme that was used in step 40, and are well-known, the details of the steps required to reconstruct the image data will not be described in further detail.

After the image data have been reconstructed, the image handler 18 proceeds to step 54 to transform the image data as required by the user to allow the image to be placed within the space allotted to it in the document. While any of a wide variety of transformation algorithms may be used to scale and/or rotate the image data, one preferred embodiment uses bi-linear interpolation algorithms to scale and to rotate the image data. Again, since such bi-linear interpolation transformation algorithms are also well-known to persons having ordinary skill in the art, they will not be described in further detail. Once the user has completed the transformations, the image handler 18 may store the commands necessary to perform the transformations selected by the user.

Finally, once the user is ready to print the image, the image handler 18 retrieves and re-constructs the compressed grayscale image data, retrieves the transformation commands, if necessary, transforms the re-constructed image data, and converts the transformed, re-constructed grayscale image data into binary or black and white image data at step 56, which binary image data are suitable for printing the image on most printers. Again, while a large number of programs are available for converting grayscale data to binary, one preferred embodiment uses a thresholding algorithm to perform the conversion. The binary image data may then be optionally stored at step 58, allowing the data to be accessed for subsequent printing.

It is contemplated that the inventive concepts herein described may be variously otherwise embodied and it is intended that the appended claims be construed to include alternative embodiments of the invention except insofar as limited by the prior art.

What is claimed is:

1. A method for transforming grayscale image data, the grayscale image data having a plurality of intensity values ranging from a black intensity value to a white intensity value, the white intensity value being greater than the black intensity value, comprising the steps of:

selecting a white punch value that is less than the white intensity value;

selecting a black punch value that is greater than the black intensity value and less than the white punch value;

replacing the intensity values that are greater than the white punch value with the white intensity value;

replacing the intensity values that are less than the black punch value with the black intensity value;

compressing the image data to create compressed image data;

storing the compressed image data as a compressed image data file;

re-constructing the compressed image data from the compressed image data file to form re-constructed image data;

transforming the re-constructed image data in accordance with preselected transformation factors to create transformed re-constructed image data; and converting the transformed re-constructed image data to binary image data.

2. The method of claim 1, further comprising the step of storing the compressed image data as a compressed image data file.

3. The method of claim 1, wherein the step of transforming the re-constructed image data comprises the step of rotating the re-constructed image data in accordance with preselected rotation factors.

4. The method of claim 1, wherein the step of compressing the image data comprises the step of compressing the image data according to a run length encoding data compression algorithm.

5. The method of claim 1, wherein the black intensity value is 0 and the white intensity value is 255.

6. The method of claim 5, wherein the black punch value is 32 and the white punch value is 196.

7. A method for transforming grayscale image data in accordance with preselected transformation factors, the grayscale image data having a plurality of intensity values ranging from a black intensity value to a white intensity value, the white intensity value being greater than the black intensity value, comprising the steps of:

selecting a white punch value that is less than the white intensity value;

selecting a black punch value that is greater than the black intensity value and less than the white punch value;

replacing the intensity values that are greater than the white punch value with the white intensity value;

replacing the intensity values that are less than the black punch value with the black intensity value;

transforming the image data in accordance with the preselected transformation factors to create transformed image data; and converting the transformed image data to binary image data.

8. The method of claim 7, wherein the step of transforming the image data comprises the step of re-scaling the image data in accordance with preselected scaling factors.

9. The method of claim 7, wherein the step of transforming the image data comprises the step of rotating the image data in accordance with preselected rotation factors.

10. The method of claim 7, wherein the black intensity value is 0 and the white intensity value is 255.

11. The method of claim 10, wherein the black punch value is 32 and the white punch value is 196.

12. The method of claim 7 implemented via an object linking and embedding program.

13. The method of claim 12, wherein the object linking and embedding program comprises OLÉ.

14. The method of claim 12, wherein the object linking and embedding program comprises OpenDoc.

15. A method of operating a computer to transform grayscale image data in accordance with preselected transformation factors, the grayscale image data having a plurality of intensity values ranging from a black intensity value to a white intensity value, the white intensity value being greater than the black intensity value, comprising the steps of:

selecting a white punch value that is less than the white intensity value;

selecting a black punch value that is greater than the black intensity value and less than the white punch value;

replacing the intensity values that are greater than the white punch value with the white intensity value;

replacing the intensity values that are less than the black punch value with the black intensity value;

transforming the image data in accordance with the preselected transformation factors to create transformed image data; and converting the transformed image data to binary image data.

16. Computer readable media comprising program code for controlling a computer to transform grayscale image data in accordance with preselected transformation factors, the grayscale image data having a plurality of intensity values ranging from a black intensity value to a white intensity value, the white intensity value being greater than the black intensity value, by performing the steps of:

selecting a white punch value that is less than the white intensity value;

selecting a black punch value that is greater than the black intensity value and less than the white punch value;

replacing the intensity values that are greater than the white punch value with the white intensity value;

replacing the intensity values that are less than the black punch value with the black intensity value;

transforming the image data in accordance with the preselected transformation factors to create transformed image data; and     converting the transformed image data to binary image data.

17. A computer programmed to transform grayscale image data in accordance with preselected transformation factors, the grayscale image data having a plurality of intensity values ranging from a black intensity value to a white intensity value, the white intensity value being greater than the black intensity value, by performing the steps of:

selecting a white punch value that is less than the white intensity value;

selecting a black punch value that is greater than the black intensity value and less than the white punch value;

replacing the intensity values that are greater than the white punch value with the white intensity value;

replacing the intensity values that are less than the black punch value with the black intensity value;

transforming the image data in accordance with the preselected transformation factors to create transformed image data; and     converting the transformed image data to binary image data.

18. A method for transforming grayscale image data in accordance with preselected transformation factors, the grayscale image data having a plurality of intensity values ranging from a black intensity value to a white intensity value, the white intensity value being greater than the black intensity value, comprising the steps of:

compressing the grayscale image data to create compressed grayscale image data;

storing the compressed grayscale image data;

retrieving the stored compressed grayscale image data;

re-constructing the compressed grayscale image data to create re-constructed grayscale image data;

transforming the re-constructed grayscale image data in accordance with the preselected transformation factors to create transformed image data; and     converting the transformed image data to binary image data.

19. A method for obtaining and processing grayscale image data, the grayscale image data having a plurality of intensity values ranging from a black intensity value to a white intensity value, comprising the steps of:

operating a scanner device to scan an image and to produce grayscale image data representative of the scanned image;

replacing the intensity values of the grayscale image data that are greater than a white punch value with a white intensity value and replacing the intensity values of the grayscale image data that are less than a black punch value with a black intensity value to produce re-mapped image data;

transforming the re-mapped image data in accordance with preselected transformation factors to produce transformed image data; and     converting the transformed image data to binary image data.

\* \* \* \* \*

UNITED STATES PATENT AND TRADEMARK OFFICE
CERTIFICATE OF CORRECTION

PATENT NO.    : 5,907,665  Page 1 of 1
DATED         : May 25, 1999
INVENTOR(S)   : Robert E. Sobol et al.

It is certified that error appears in the above-identified patent and that said Letters Patent is hereby corrected as shown below:

<u>Column 9,</u>
Lines 63-65, delete "2.  The method of claim 1, further comprising the step of storing the compressed image data as a compressed image data file." and insert therefor
-- 2.    The method of claim1, wherein the step of transforming the re-constructed image data comprises the step of re-scaling the re-constructed image data in accordance with preselected scaling factors. --

Signed and Sealed this

Seventeenth Day of September, 2002

Attest:

Attesting Officer

JAMES E. ROGAN
*Director of the United States Patent and Trademark Office*